(12) United States Patent
Nonoyama et al.

(10) Patent No.: US 11,145,877 B2
(45) Date of Patent: *Oct. 12, 2021

(54) FUEL CELL

(71) Applicant: TOYOTA JIDOSHA KABUSHIKI KAISHA, Toyota (JP)

(72) Inventors: Nobuaki Nonoyama, Chiryu (JP); Norishige Konno, Toyota (JP); Masayuki Ito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 52 days.

This patent is subject to a terminal disclaimer.

(21) Appl. No.: 16/364,907

(22) Filed: Mar. 26, 2019

(65) Prior Publication Data

US 2019/0305326 A1   Oct. 3, 2019

(30) Foreign Application Priority Data

Mar. 28, 2018   (JP) .............................. JP2018-063277

(51) Int. Cl.

| | |
|---|---|
| *H01M 8/026* | (2016.01) |
| *H01M 8/0267* | (2016.01) |
| *H01M 8/1004* | (2016.01) |
| *H01M 8/04029* | (2016.01) |
| *H01M 8/2457* | (2016.01) |
| *H01M 8/241* | (2016.01) |
| *H01M 8/04089* | (2016.01) |

(Continued)

(52) U.S. Cl.
CPC ......... *H01M 8/026* (2013.01); *H01M 4/8807* (2013.01); *H01M 8/0267* (2013.01); *H01M 8/04029* (2013.01); *H01M 8/04089* (2013.01); *H01M 8/1004* (2013.01); *H01M 8/241* (2013.01); *H01M 8/2457* (2016.02); *H01M 2008/1095* (2013.01)

(58) Field of Classification Search
CPC ... H01M 8/0267; H01M 8/1004–1006; H01M 4/8807; H01M 8/00–04089; H01M 8/24–2457; H01M 8/02–0267; H01M 8/04–04089; H01M 8/10–1004; H01M 8/026; H01M 8/2457; H01M 8/04029; H01M 8/0408; H01M 8/241; H01M 2008/1095
USPC ......................................................... 429/457
See application file for complete search history.

(56) References Cited

U.S. PATENT DOCUMENTS

| | | | |
|---|---|---|---|
| 2009/0004535 A1 | 1/2009 | Sugita et al. | |
| 2009/0239129 A1* | 9/2009 | Seido .................. | H01M 8/0276 429/437 |

(Continued)

FOREIGN PATENT DOCUMENTS

| | | |
|---|---|---|
| JP | 2006-147466 | 6/2006 |
| JP | 2007-141553 | 6/2007 |

(Continued)

*Primary Examiner* — Ladan Mohaddes
*Assistant Examiner* — Niara Trant
(74) *Attorney, Agent, or Firm* — Finnegan, Henderson, Farabow, Garrett & Dunner, LLP

(57) ABSTRACT

A fuel cell includes: an electrolyte membrane; first and second catalyst layers respectively formed on first and second surface of the electrolyte membrane; and a separator disposed opposite to the electrolyte membrane with respect to the first catalyst layer.

10 Claims, 7 Drawing Sheets

(51) Int. Cl.
  *H01M 4/88* (2006.01)
  *H01M 8/1018* (2016.01)

(56) References Cited

U.S. PATENT DOCUMENTS

| | | | |
|---|---|---|---|
| 2013/0337359 A1* | 12/2013 | Sugiura | H01M 8/0267 429/457 |
| 2015/0132680 A1 | 5/2015 | Asano et al. | |
| 2017/0207478 A1 | 7/2017 | Mohri et al. | |

FOREIGN PATENT DOCUMENTS

| | | |
|---|---|---|
| JP | 2009-009837 | 1/2009 |
| JP | 2011-044300 | 3/2011 |
| JP | 2014-026960 | 2/2014 |
| JP | 2015-111558 | 6/2015 |
| WO | WO 2010/082589 | 7/2010 |

\* cited by examiner of the drawings.

FUEL CELL

CROSS-REFERENCE TO RELATED APPLICATION

This application is based upon and claims the benefit of priority of the prior Japanese Patent Application No. 2018-063277, filed on Mar. 28, 2018, the entire contents of which are incorporated herein by reference.

TECHNICAL FIELD

The present disclosure relates to a fuel cell.

BACKGROUND

A separator of a fuel cell is formed with flow path grooves through which reactant gas flows between the separator and a catalyst layer formed on an electrolyte membrane. A part of the reactant gas flowing through the flow path grooves is supplied to the catalyst layer, so that the power generation reaction occurs. For example, in Japanese Unexamined Patent Application Publication No. 2006-147466, the separator is formed with wavy grooves as the flow path grooves.

For example, in Japanese Unexamined Patent Application Publication No. 2006-147466, the wavy groove is formed in a wavy shape having predetermined amplitude, whereas the edge of the catalyst layer is formed substantially linearly. There is a large interval between a wavy groove closest to the edge of the catalyst layer and the edge of the catalyst layer. In such an interval, the reactant gas might not be sufficiently supplied to the catalyst layer, and the power generation performance of the fuel cell might be degraded.

SUMMARY

It is an object of the present disclosure to provide a fuel cell that suppresses deterioration of power generation performance.

The above object is achieved by a fuel cell including: an electrolyte membrane; first and second catalyst layers respectively formed on first and second surface of the electrolyte membrane; and a separator disposed opposite to the electrolyte membrane with respect to the first catalyst layer, wherein the separator includes flow path grooves through which reaction gas flows between the separator and the first catalyst layer, the flow path grooves include: wavy grooves wavily extending in a first direction and arranged in a second direction orthogonal to the first direction; and first and second end grooves between which the wavy grooves are located in the second direction, the first catalyst layer includes first and second edges facing each other in the second direction, the first and second end grooves are respectively adjacent to the first and second edges of the first catalyst layer in the second direction, the first and second end grooves respectively extend in the first direction within first and second regions, the first and second regions extend in the first direction, and each width of the first and second regions in the second direction is smaller than each amplitude of the wavy grooves.

The first end groove extends in the first direction within the first region, the first region extends in the first direction, and the width of the first region in the second direction is smaller than each amplitude of the wavy grooves. Therefore, as compared with a case where the first end groove has a wavy shape with amplitude the same as each amplitude of the wavy grooves, it is possible to suppress an increase in the interval from the first end groove to the first edge of the first catalyst layer in the second direction. Likewise, the second end groove extends in the first direction within the second region, the second region extends in the first direction, and the width of the second region in the second direction is smaller than each amplitude of the wavy grooves. Therefore, as compared with a case where the second end groove has a wavy shape with amplitude the same as each amplitude of the wavy grooves, it is possible to suppress an increase in the interval from the second end groove to the second edge of the first catalyst layer in the second direction. It is therefore possible to respectively supply the reaction gas flowing through the first and second end grooves to the first and second edges of the first catalyst layer, thereby suppressing the deterioration of power generation performance of the fuel cell.

At least one of the first and second end grooves linearly may extend in the first direction.

At least one of the first and second end grooves wavily may extend in the first direction.

At least one of the first and second end grooves may include a linear portion and a curved portion.

The fuel cell may further include a communication groove communicating the first end groove with the wavy groove closest to the first end groove among the wavy grooves, wherein a depth of the communication groove may be smaller than each depth of the flow path grooves.

A width of the communication groove may be smaller than each width of the flow path grooves.

Wavelengths of the wavy grooves may be identical to each other.

Phases of the wavy grooves may be identical to each other.

Amplitude of the wavy grooves may be identical to each other.

Amplitude of the wavy groove closest to the first end groove among the wavy grooves may be smaller than each amplitude of the wavy grooves other than the wavy groove closest to the second end groove among the wavy grooves.

DETAILED DESCRIPTION

Figure 1:
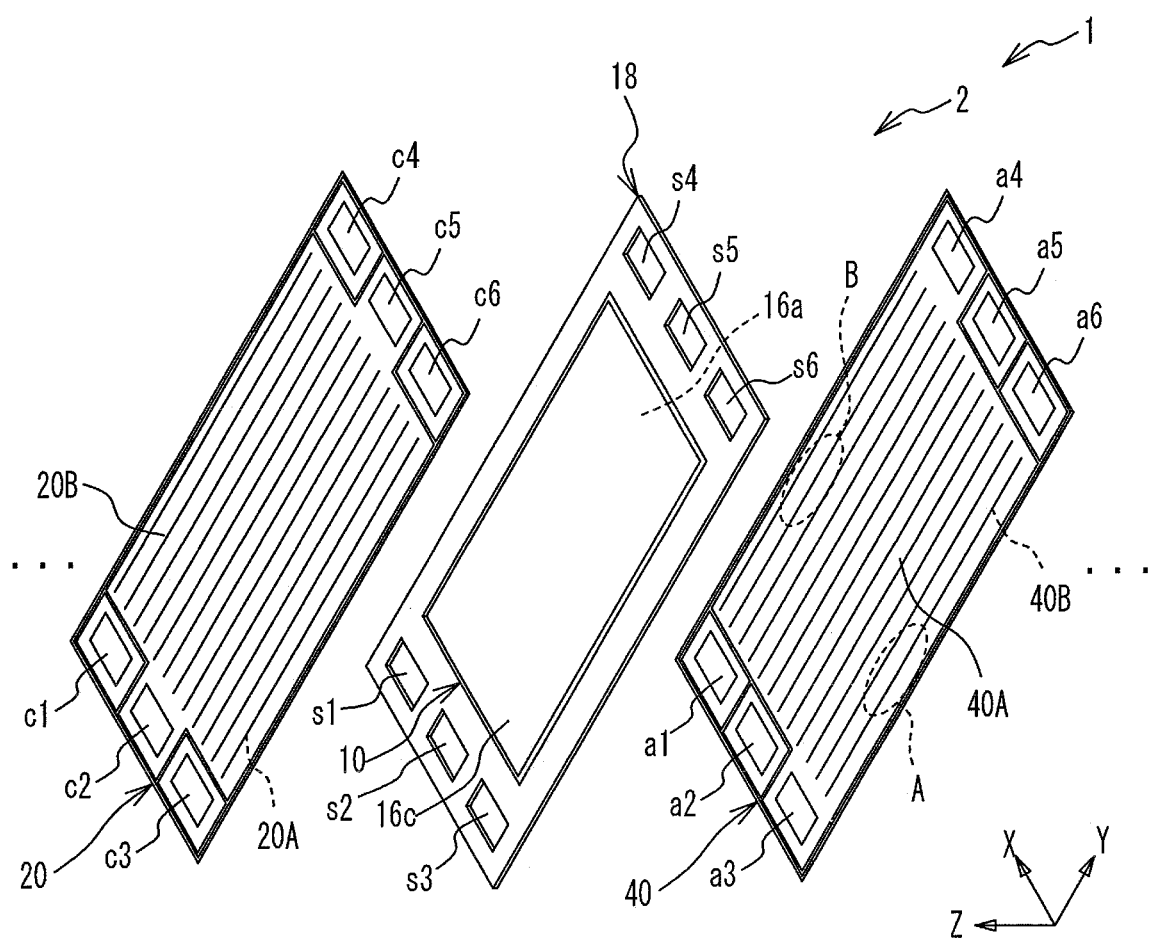
FIG. 1 is an exploded perspective view of a unit cell of a fuel cell.

FIG. 1 is an exploded perspective view of a unit cell 2 of a fuel cell 1. The fuel cell 1 is configured by stacking unit cells 2. FIG. 1 illustrates only one unit cell 2, and omits other unit cells. The unit cell 2 is stacked with other unit cells in the Z direction illustrated in FIG. 1. The unit cell 2 has a substantially rectangular shape. The longitudinal direction and the short direction of the unit cell 2 correspond to the Y direction and the X direction illustrated in FIG. 1, respectively.

The fuel cell 1 is a polymer electrolyte fuel cell that generates electric power with a fuel gas (for example, hydrogen) and an oxidant gas (for example, oxygen) as reactant gases. The unit cell 2 includes: a membrane electrode gas diffusion layer assembly (MEGA) 10; a support frame 18 supporting the MEGA 10; a cathode separator 20 and an anode separator 40 (hereinafter referred to as separators) sandwiching the MEGA 10. The MEGA 10 has a cathode gas diffusion layer 16c and an anode gas diffusion layer 16a (hereinafter referred to as diffusion layers). The support frame 18 has a substantially frame shape, and its inner peripheral side is joined to a peripheral region of the MEGA 10.

Holes c1 to c3 are formed along one of two short sides of the separator 20, and holes c4 to c6 are formed along the other side. Likewise, holes s1 to s3 are formed along one side of two short sides of the support frame 18, and holes s4 to s6 are formed along the other side. Likewise, holes a1 to a3 are formed along one side of two short sides of the separator 40, and holes a4 to a6 are formed along the other side. The holes c1, s1, and a1 communicate with one another to define a cathode inlet manifold. Likewise, the holes c2, s2, and a2 define a coolant inlet manifold. The holes c3, s3, and a3 define an anode outlet manifold. The holes c4, s4, and a4 define an anode inlet manifold. The holes c5, s5, and a5 define a coolant outlet manifold. The holes c6, s6, and a6 define a cathode outlet manifold. In the fuel cell 1 according to the present embodiment, liquid cooling water is used as a coolant.

A surface of the separator 40 facing the MEGA 10 is formed with an anode flow path portion 40A (hereinafter referred to as flow path portion) which communicate the anode inlet manifold with the anode outlet manifold and along which the fuel gas flows. The surface of the separator 20 facing the MEGA 10 is formed with a cathode flow path portion 20A (hereinafter referred to as flow path portion) which communicate the cathode inlet manifold with the cathode outlet manifold and along which the oxidant gas flows. The surface of the separator 40 opposite to the flow path portion 40A and the surface of the separator 20 opposite to the flow path portion 20A are respectively formed with coolant flow path portions 40B and 20B (hereinafter referred to as flow path portions) which communicate the coolant inlet manifold with the coolant outlet manifold and along which the coolant flows. The flow path portions 20A and 20B extend in the longitudinal direction of the separator 20 (Y direction). Likewise, the flow path portions 40A and 40B extend in the longitudinal direction of the separator 40 (Y direction). Each flow path portion is basically provided in a region, facing the MEGA 10, of the separator in the XY plane. The separators 20 and 40 are made of a material having a gas blocking property and electrical conductivity, and are thin plate shaped members formed by pressing stainless steel, metal such as titanium or titanium alloy. Additionally, FIG. 1 illustrates a region A located at an end portion, farthest from the center in the −X direction, of the flow path portion 40A of the separator 40, and a region B located at an end portion farthest from the center in the +X direction, as will be described later in detail.

Figure 2:
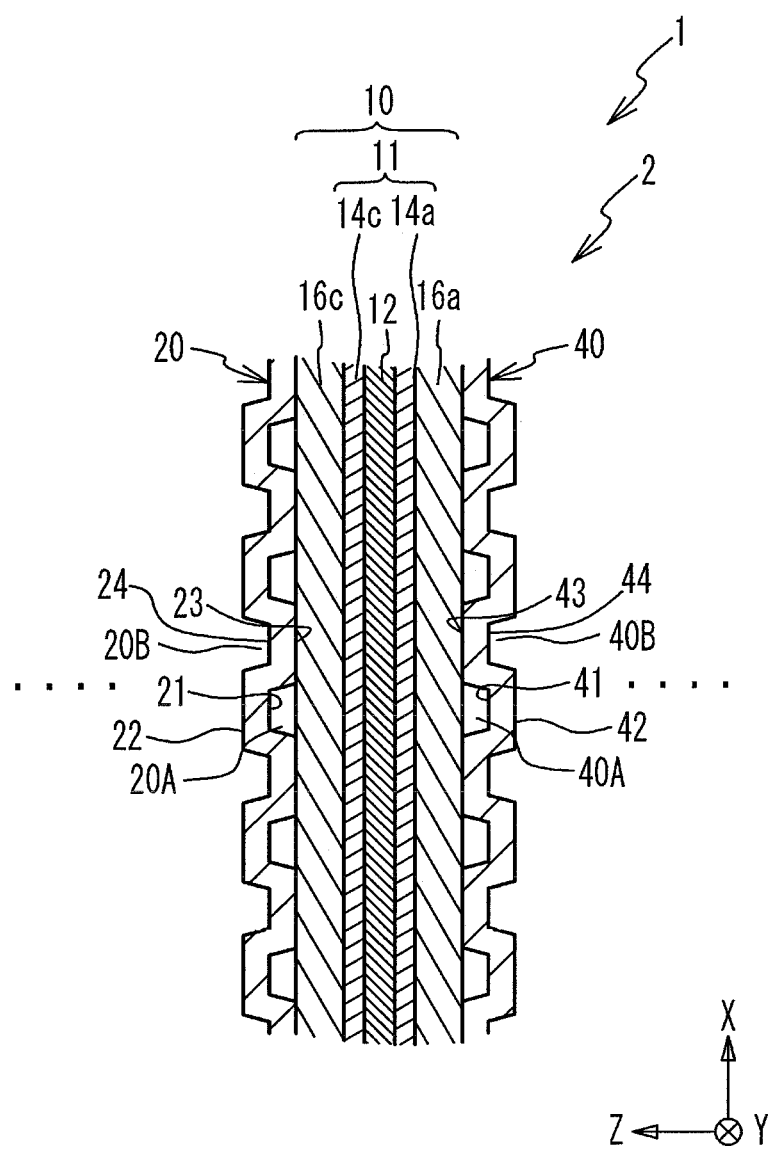
FIG. 2 is a partially cross-sectional view of the fuel cell where the unit cells are stacked.

FIG. 2 is a partially cross-sectional view of the fuel cell 1 where the unit cells 2 are stacked. FIG. 2 illustrates only one unit cell 2, and omits the other unit cells. FIG. 2 illustrates a cross section orthogonal to the Y direction.

The MEGA 10 includes the diffusion layers 16a and 16c, and a membrane electrode assembly (MEA) 11. The MEA 11 includes an electrolyte membrane 12, and an anode catalyst layer 14a and a cathode catalyst layer 14c (hereinafter referred to as catalyst layers) formed on one surface and the other surface of the electrolyte membrane 12, respectively. The electrolyte membrane 12 is a solid polymer thin film, such as a fluorine-based ion exchange membrane, with high proton conductivity in a wet state. The catalyst layers 14a and 14c are made by coating a catalyst ink containing a carbon support carrying platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

Each of the flow path portions 20A, 20B, 40A, and 40B has a wavy shape in cross section when viewed in the Y direction. Specifically, regarding the flow path portion 20A, a flow path groove 21, recessed away from the diffusion layer 16c, and a rib 23, protruding to and contacting with the diffusion layer 16c, are alternately arranged in the X direction. The cathode gas, flowing along the insides of the flow path grooves 21, is supplied to the catalyst layer 14c of the MEA 11 via the diffusion layer 16c. Further, regarding the flow path portion 20B, a rib 22, protruding opposite to the diffusion layer 16c and contacting with an anode separator of another unit cell (not illustrated) adjacent to the separator 20 in the −Z direction, and a flow path groove 24, receded away from this anode separator, are alternately arranged in the X direction. The coolant flows along the insides of the flow path grooves 24. Herein, the flow path grooves 21 and the ribs 22 are formed integrally on the front and rear surfaces, and the ribs 23 and the flow path grooves 24 are formed integrally on the front and rear surfaces. The flow path grooves 21 and 24 and the ribs 22 and 23 extend in the Y direction.

Likewise, regarding the flow path portion 40A, a flow path groove 41, recessed away from the diffusion layer 16a, and a rib 43, protruding to and contacting with the diffusion layer 16a are alternately arranged in the X direction. The anode gas, flowing along the insides of the flow path grooves 41, is supplied to the catalyst layer 14a of the MEA 11 via the diffusion layer 16a. Further, regarding the flow path portion 40B, a rib 42, protruding opposite to the diffusion layer 16a and contacting with a cathode separator of another unit cell (not illustrated) adjacent to the separator 40 in the +Z direction, and a flow path groove 44, receded away from this cathode separator, are alternately arranged in the X direction. The coolant flows along the insides of the flow path grooves 44. Herein, the flow path grooves 41 and the ribs 42 are formed integrally on the front and rear surfaces, and the ribs 43 and the flow path grooves 44 are formed integrally on the front and rear surfaces. The flow path grooves 41 and 44 and the ribs 42 and 43 extend in the Y direction.

Figure 3A:
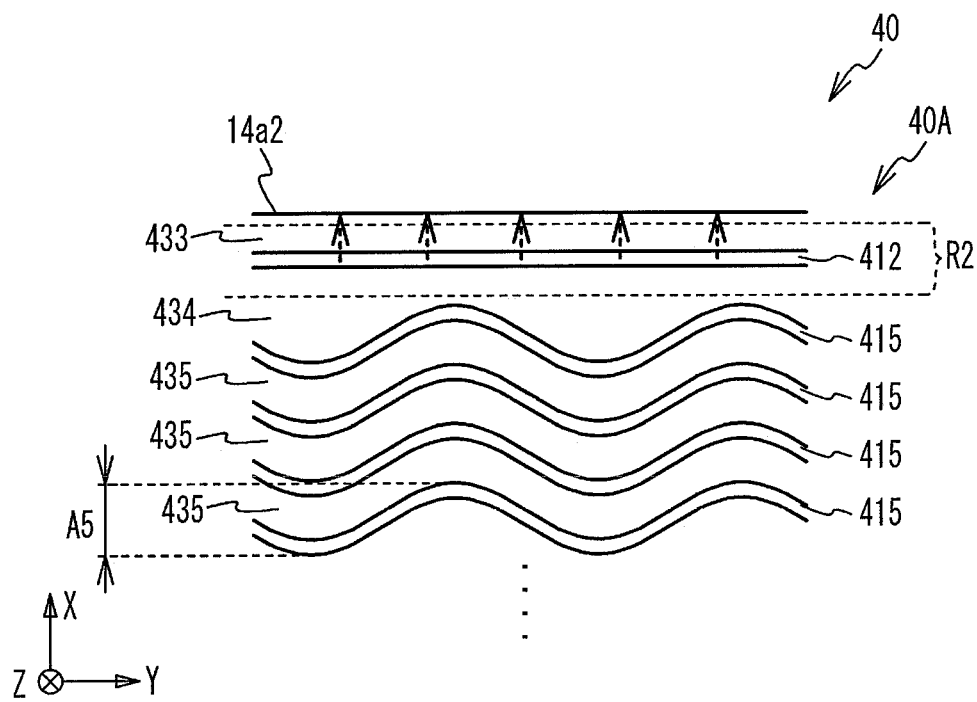
FIG. 3A is an enlarged view of a region located at an end portion, farthest from the center in the +X direction, of a flow path portion of a separator in the present embodiment.
Figure 3B:
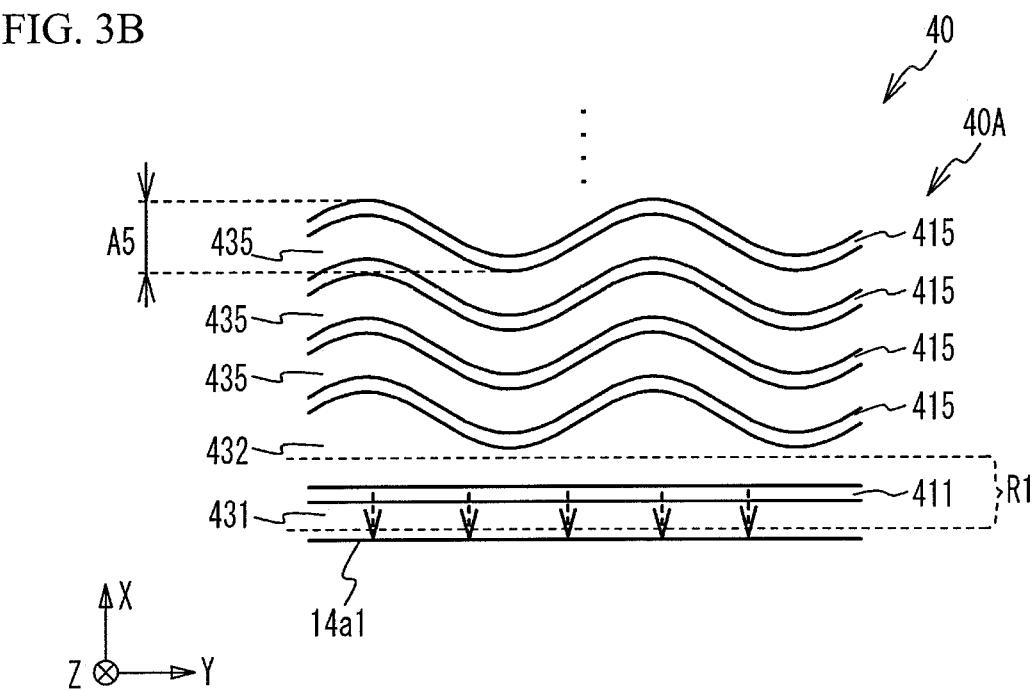
FIG. 3B is an enlarged view of a region located at an end portion, farthest from the center in the −X direction, of the flow path portion of the separator in a present embodiment.

FIG. 3A is an enlarged view of the region B located at the end portion, farthest from the center in the +X direction, of the flow path portion 40A of the separator 40 in the present embodiment. FIG. 3B is an enlarged view of the region A at the end portion, farthest from the center in the −X direction, of the flow path portion 40A of the separator 40 in the present embodiment. The regions A and B correspond to the ends of the separator 40 distant away from each other in the X direction. FIGS. 3A and 3B illustrate grooves 411, 412, and 415, and ribs 431 to 435. The grooves 411, 412, and 415 are included in the flow path grooves 41 illustrated in FIG. 2. The ribs 431 to 435 are included in the ribs 43 illustrated in FIG. 2. The grooves 411, 412, 415 and the ribs 431 to 435 are arranged in the X direction. Among flow path grooves 41 formed in the flow path portion 40A, the groove 411 is located farthest from the center in the −X direction, and the groove 412 is located farthest from the center in the +X direction. The rib 431 is located next to the groove 411 in the −X direction. The rib 432 is located between the grooves 411 and 415 adjacent to each other. The rib 435 is located between two adjacent grooves 415. The rib 433 is located next to the groove 412 in the +X direction. The rib 434 is located between the grooves 412 and 415 adjacent to each other. FIG. 3A illustrates an edge 14a2, located farthest from the center in the +X direction, of the catalyst layer 14a. FIG. 3B illustrates an edge 14a1, located farthest from the center in the −X direction, of the catalyst layer 14a. The edges 14a1 and 14a2, substantially perpendicular to the X direction and substantially parallel to each other, extend substantially linearly in the Y direction. The edges 14a1 and 14a2 are examples of the first and second edges facing each other in the X direction.

Although the grooves 411 and 412 each has a linear shape, the grooves 415 each has a wavy shape. The grooves 415 is an example of wavy grooves wavily extending in the Y direction and arranged in the X direction orthogonal to the Y direction. Additionally, in FIG. 1, the flow path portion 40A is simply illustrated by straight lines. The grooves 411 and 412 are examples of the first and second end grooves between which the grooves 415 are located in the X direction. FIGS. 3A and 3B illustrate amplitude A5 of the groove 415. FIGS. 3A and 3B respectively illustrate regions R2 and R1. Each width of the regions R2 and R1 in the X direction is smaller than the amplitude A5 of the groove 415. The regions R2 and R1 extend in the Y direction. The grooves 411 and 412 respectively extend in the Y direction within the regions R1 and R2. The grooves 411 and 412 are respectively adjacent to the edges 14a1 and 14a2 in the X direction, and are the closest to the edges 14a1 and 14a2 among the flow path grooves 41. Further, the flow path grooves 41 are formed between the edges 14a1 and 14a2 in the X direction. Therefore, all of the flow path grooves 41 overlap the catalyst layer 14a in the Z direction. The pitch interval between the grooves 415 in the X direction are substantially the same. The grooves 415 have the same wavelength, the same phase, and the same amplitude.

In addition, the rib 435 between the adjacent grooves 415 also has a wavy shape. A side surface of the rib 431 along the groove 411 and a side surface of the rib 433 along the groove 412 each has a substantially linear shape. Illustration of the other side surface, away from the above-described side surface in the −X direction, of the rib 431, and illustration of the other side surface, away from the above-described side surface in the +X direction, of the rib 433, is omitted. A side surface of the rib 434 along the groove 412 has a linear shape. The other side surface of the rib 434 along the groove 415 adjacent thereto has a wavy shape. Likewise, a side surface of the rib 432 along the groove 411 has a linear shape. The other side surface of the rib 432 along the groove 415 adjacent thereto has a wavy shape.

Referring to FIG. 2, a description will be given of one of the main reasons why the grooves 415 and the ribs 435 are partially wavy shaped. For example, in a case where all of the flow path grooves 41 and the ribs 43 of the separator 40 and all of the flow path grooves 21 and the ribs 23 of the separator 20 are linear, if the relative position between the separators 20 and 40 is displaced from the desired position in the planar direction, the rib 23 of the separator 20 is positionally displaced from the rib 43 of the separator 40 in the X direction in the state where the MEGA 10 is sandwiched therebetween. Since the MEGA 10 has low rigidity, if the ribs 23 of the separator 20 are positionally displaced from the ribs 43 of the separator 40 in the X direction in a long range (for example, 4 mm or more) in the Y direction, the MEGA 10 might be bent to be locally subjected to strong stress, so that the strength of the MEA 11 might decrease. In contrast, in a case where the flow path grooves 21 and the ribs 23 of the separator 20, facing the grooves 415 and the ribs 435 each having a wavy shape via the MEGA 10, each has a linear shape, or a wavy shape different from the wavy shape of the grooves 412 to 415 in phase, amplitude, wavelength and the like, even if the relative position between the separators 20 and 40 is displaced from the desired position as described above, the MEGA 10 is suppressed from being bent by positionally displacing the ribs 23 of the separator 20 from the ribs 43 of the separator 40 in the X direction in a long range in the Y direction. This suppresses the decrease in strength of the MEA 11. In the present embodiment, the flow path grooves 21 and the ribs 23 of the separator 20, facing the grooves 415 and the ribs 435 via the MEGA 10, each has a linear shape, but they not limited thereto.

Figure 4A:
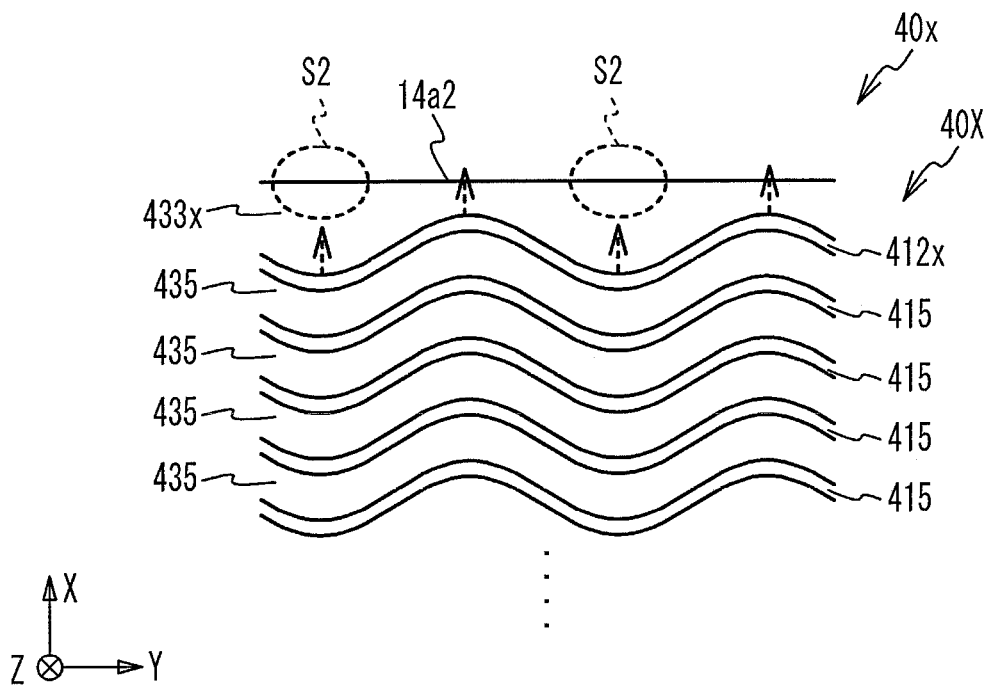
FIGS. 4A and 4B are enlarged views illustrating a part of a flow path portion of a separator in a comparative example.
Figure 4B:
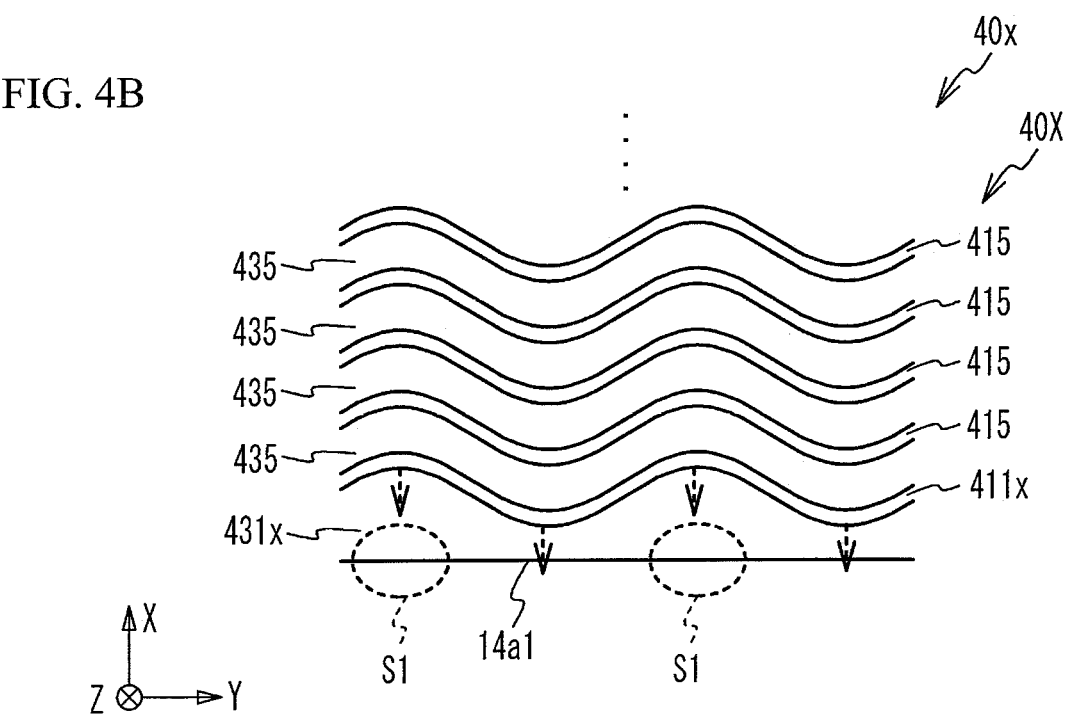

FIGS. 4A and 4B are enlarged views illustrating a part of a flow path portion 40X of a separator 40x in a comparative example. FIGS. 4A and 4B respectively correspond to FIGS. 3A and 3B. Unlike the flow path portion 40A in the present embodiment, the flow path portion 40X of the separator 40x has grooves 411x and 412x each having a wavy shape, instead of the grooves 411 and 412 each having a linear shape. The grooves 411x and 412x each has substantially the same amplitude, the same phase, and the same wavelength, as the grooves 415. That is, the grooves 411x and 412x are substantially the same in shape and size as the grooves 415. Therefore, in the flow path portion 40X, the widths of ribs 431x and 433x that are respectively adjacent to the grooves 411x and 412x in the X direction are partially enlarged. Therefore, there is a part S1, in which an interval from the groove 411x to the edge 14a1 in the X direction increases, between the groove 411x and the edge 14a1. In this part S1, the width of the rib 431x in the X direction is greater than that of the other part. Accordingly, the contact area between the rib 431x and the diffusion layer 16a increases in this part S1. Therefore, the anode gas flowing through the groove 411x might not be sufficiently supplied to the part S1, and the anode gas might not be sufficiently supplied to the edge 14a1. Likewise, there is a part S2 in which an interval from the groove 412x to the edge 14a2 in the X direction increases. Therefore, the anode gas flowing through the groove 412x might not be sufficiently supplied to the part S2, and the anode gas might not be sufficiently supplied to the edge 14a2. As described above, in the case of using the separator 40*x* in the comparative example, the anode gas might not be sufficiently supplied over the entire surface of the catalyst layer 14*a*, which might degrade the power generation performance.

On the other hand, the groove 411, closest to the edge 14*a*1 among the flow path grooves 41, has a linear shape in substantially parallel to the edge 14*a*1 in the present embodiment illustrated in FIG. 3A. Therefore, the interval from the groove 411 to the edge 14*a*1 in the X direction is substantially constant in the Y direction. It is thus possible to supply the anode gas flowing through the groove 411 to the edge 14*a*1 of the catalyst layer 14*a* in a substantially uniform manner in the Y direction. Likewise, the groove 412, closest to the edge 14*a*2 among the flow path grooves 41, has a linear shape in substantially parallel to the edge 14*a*2. Therefore, the interval from the groove 412 to the edge 14*a*2 in the X direction is substantially constant in the Y direction. It is thus possible to supply the anode gas flowing through the groove 412 to the edge 14*a*2 of the catalyst layer 14*a* in a substantially uniform manner in the Y direction. In such a manner, it is possible to suppress the anode gas from not being supplied to a part of the catalyst layer 14*a*, and to suppress the deterioration of the power generation performance. It is also possible to suppress the deterioration of the power generation performance due to deterioration of the catalyst layer 14*a* caused by hydrogen deficiency.

For example, in the comparative example illustrated in FIGS. 4A and 4B, in order to ensure the supply of the anode gas to the parts S1 and S2, conceivably, the widths, in the X direction, of the grooves 411*x* and 412*x* respectively closest to the edges 14*a*1 and 14*a*2 are partially increased to respectively approach the part S1 and S2. In this case, since the widths of these grooves are partially increased, the clamping force in the Z direction might not sufficiently exert on the MEA 11 at such an increased part, so that the MEA 11 might expand and contract repeatedly to lower the strength thereof. Further, at the part where the width of the groove partially increases, the flow velocity of the anode gas might decrease, so that the drainability might be degraded and the liquid water might stay. On the other hand, in the present embodiment, the widths of the grooves 411 and 412 in the X direction are substantially constant in the Y direction. Therefore, the clamping force sufficiently exerts on the MEA 11, which suppresses the decrease in the strength of the MEA 11 and suppresses the deterioration of the drainability.

Herein, although the temperature of the fuel cell 1 is increased by power generation, the temperature at the outer peripheral portion of the fuel cell 1 tends to relatively decrease due to the ambient temperature. Therefore, the separator 40 also easily cools at both end portions, spaced away from each other in the X direction, of the flow path portion 40A, so that condensed water tends to be generated around the both end portions in the unit cell 2. Herein, the grooves 411 and 412, each having a linear shape, are respectively located at the end portion farthest from the center in the −X direction and at the end portion farthest from the center in the +X direction. This suppresses the staying of water in the grooves 411 and 412 each having a linear shape, and the anode gas flowing through the grooves 411 and 412 allows the water to flow to the downstream side. Accordingly, the drainability is improved.

Further, for example, when the fuel cell 1 in the present embodiment is used in a posture in which, for example, the Z direction is the gravity direction, the grooves 411 and 412 allow water generated on the anode side to flow to the downstream side. For example, when the fuel cell 1 in the present embodiment is used in a posture in which the +X direction is the gravity upward direction, the groove 411 is located below the other grooves in the gravity direction. Therefore, even when, for example, water generated on the anode side enters the groove 411, the drainability is improved by the anode gas flowing through the groove 411. Likewise, when the fuel cell 1 in the present embodiment is used in a posture in which, for example, the −X direction is the gravity upward direction, the groove 412 is located below the other grooves in the gravity direction. Therefore, for example, even when water generated on the anode side enters the groove 412, the drainability is improved by the anode gas flowing through the groove 412. As described above, the drainability is ensured regardless of the posture of the fuel cell 1 in use.

The grooves 415 have substantially the same wavelength, the same phase, the same amplitude, and the common shape. Here, in general, as for pressing, the shape of a metal plate formed by dies is not always the same as the reversed shape of the die. After the metal plate is deformed by the die, the shape of the metal plate slightly becomes to its original shape before the molding, due to the elasticity of the metal plate. This is called spring back. For this reason, this spring back is taken into consideration in designing the dies. In a case where groove shapes differ from each other, it might be needed to design the dies for the respective groove shapes, and it might take a long time for designing the dies. In the present embodiment, the grooves have the common shape. It is thus possible to suppress the long time required to design the dies. In the case of forming a precise shape like a separator for a fuel cell, the metal plate is pressed with different dies several times, so that the metal plate is gradually expanded to achieve the final product shape. In a case where the wavy shapes in the final product shape differ from each other, the design of the dies used in pressing is different, so that the time required to design the dies might be further prolonged. On the other hand, the grooves 415 have the common shape in the present embodiment. It is thus possible to form the common shape in the dies for pressing, and to suppress the prolongation of the time required to design the dies for producing the separator 40*a*.

As described above, the grooves 411 and 412 linearly extend in the Y direction within the regions R1 and R2, each width of which in the X direction is smaller than each amplitude of the grooves 415. However, the two end grooves each may have any shape as long as the two end grooves extend in the Y direction within such regions R1 and R2, respectively. As long as the two end grooves extend in the Y direction within such regions R1 and R2, each shape of the two end grooves is similar to a liner shape than to the shape of the groove 415, thereby promoting the supply of the anode gas to the edges 14*a*1 and 14*a*2 as well as the present embodiment. For example, the end groove may wavily extend in the Y direction, or may have a linear portion and a curved portion. Such variations will be described below.

Next, variations will be described. In the following variations, only the end groove adjacent to the edge 14*a*1 is illustrated and described, and the description of the end groove adjacent to the edge 14*a*2 is omitted. In the variations, the same reference numerals are given to the same components as those of the above-described embodiment, and duplicated explanation is omitted.

Figure 5A:
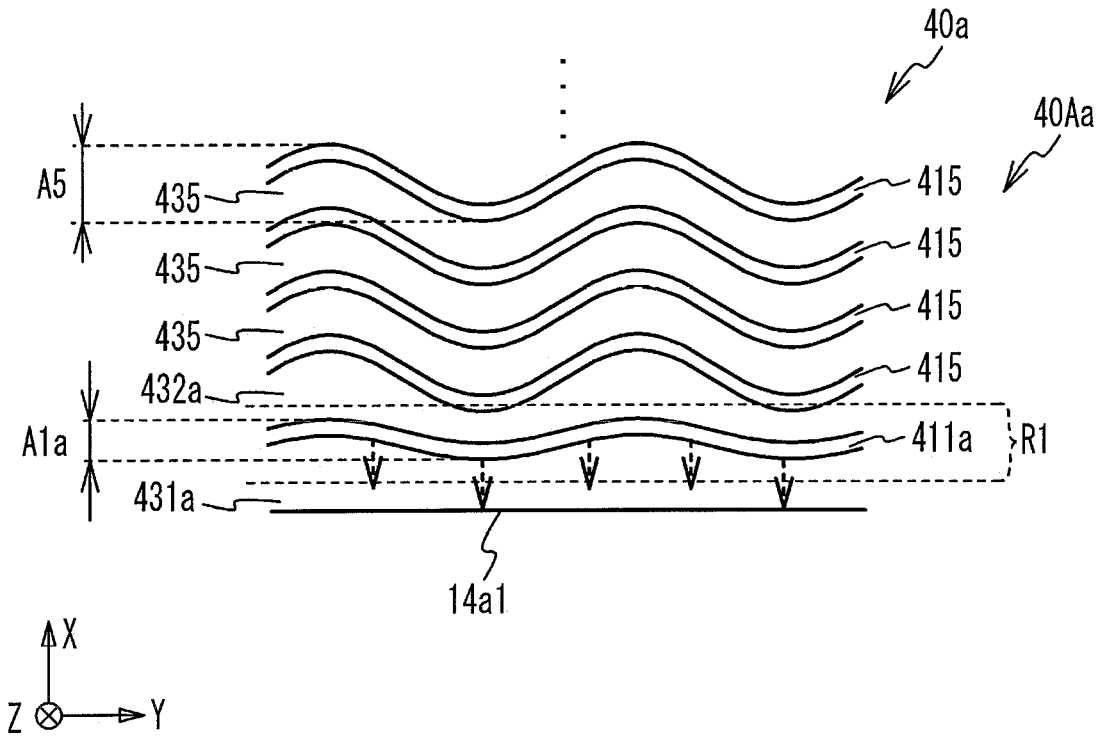
FIG. 5A is an enlarged view illustrating a part of a flow path portion of a separator in a first variation.

FIG. 5A is an enlarged view illustrating a part of a flow path portion 40Aa of a separator 40*a* in a first variation. FIG. 5A corresponds to FIG. 3B. In the flow path portion 40Aa, a groove 411*a* also has a wavy shape, like the groove 415, unlike the groove 411 having a linear shape in the above-described embodiment. The groove 411a has substantially the same wavelength and the same phase as each of the grooves 415, but differs in amplitude. Specifically, amplitude A1a of the groove 411a is smaller than the amplitude A5 of the groove 415. Therefore, the groove 411a also extends in the Y direction within the region R1, like the groove 411 having a linear shape in the above-described embodiment. In other words, the groove 411a has a shape similar to the liner shape of the edge 14a1, as compared with the groove 415. Even in such a configuration, it is possible to suppress the increase in the interval from the groove 411a to the edge 14a1 in the X direction, and to supply the anode gas to the edge 14a1 of the catalyst layer 14a, thereby suppressing the deterioration of the power generation performance. A side surface of a rib 431a adjacent to the groove 411a also has a wavy shape.

In the first variation, the groove 411a does not have a linear shape, but a wavy shape, and has the same phase and the same wavelength as the groove 415. This suppresses the increase in the interval, in the X direction, between the grooves 411a and 415 adjacent to each other. Thus, the anode gas is supplied between the grooves 411a and 415 adjacent to each other from these grooves, thereby suppressing the deterioration of the power generation performance.

In general, if the difference in pressure loss of the anode gas between the adjacent two grooves is large, the difference in flow rate of the anode gas might increase, so that the anode gas might be hardly supplied to a part of the catalyst layer 14a. Herein, such a difference in pressure loss of the anode gas tends to increase, in a case where the two adjacent grooves drastically differ in shape. On the other hand, in the first variation, the groove 411a has a wavy shape like the shape of the groove 415 adjacent thereto. This suppresses the increase in the difference in pressure loss of the anode gas between the grooves 411a and 415 adjacent to each other. It is thus possible to suppress the anode gas from being hardly supplied to a part of the catalyst layer 14a, and to suppress the deterioration of the power generation performance.

In the present embodiment as described above, the flow path grooves 44 in which the coolant flows are formed on the rear side of the ribs 43. Likewise, in the first variation, the two flow path grooves 44 are formed on the rear sides of ribs 432a and 435 each having substantially the same shape thereas. It is therefore possible to suppress the increase in the difference in pressure loss of the coolant between the flow path grooves 44 formed on the rear sides of the ribs 432a and 435. As a result, it is possible to suppress the MEA 11 from not being partially cooled due to a part of the coolant hardly flowing, and to suppress the deterioration of the power generation performance.

Figure 5B:
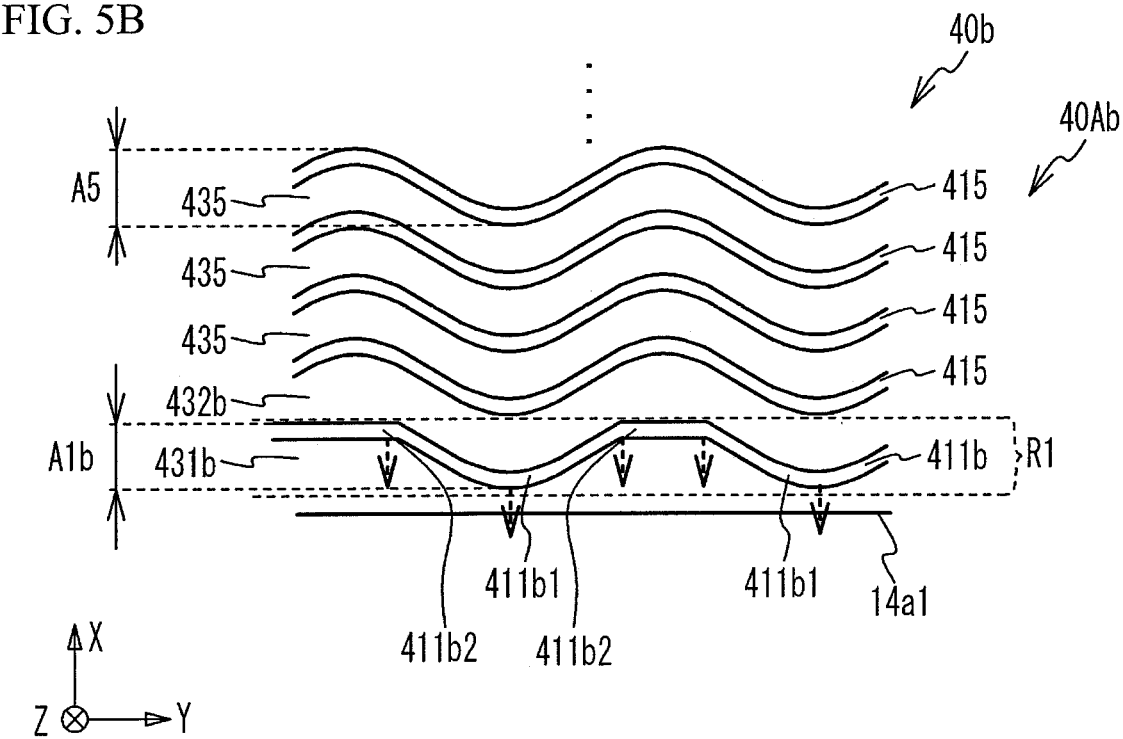
FIG. 5B is an enlarged view illustrating a part of a flow path portion of a separator in a second variation.

FIG. 5B is an enlarged view illustrating a part of a flow path portion 40Ab of a separator 40b in a second variation. FIG. 5B corresponds to FIG. 3B. A groove 411b has a shape in which a curved portion 411b1, a linear portion 411b2, another curved portion 411b1, another linear portion 411b2 . . . are continuous in the Y direction. The curved portion 411b1 has a curved shape to protrude in the −X direction, that is, toward the edge 14a1, and has substantially the same shape as the curved portion of the groove 415 to which the curved portion 411b1 is adjacent in the +X direction. On the other hand, the linear portion 411b2 has a linear shape extending in the Y direction in substantially parallel to the edge 14a1. Therefore, amplitude A1b of the groove 411b is smaller than the amplitude A5 of the groove 415. Further, the groove 411b extends in the Y direction within the above-described region R1. Furthermore, the linear portion 411b2 is adjacent to a part of the curved portion of the groove 415 in the +X direction, and the part is curved so as to protrude in the +X direction. As described above, since the linear portion 411b2 is not curved away from the edge 14a1, it is possible to supply the anode gas to the edge 14a1 of the catalyst layer 14a, and to suppress the deterioration of the power generation performance. Since the groove 411b partially has the linear portion 411b2, the groove 411b has a shape similar to that of the linear edge 14a1 as compared with the groove 415. Likewise, a side surface of a rib 431b adjacent to the groove 411b, and a side surface of a rib 432b adjacent to the groove 411b each include wavy portions and linear portions.

Figure 6A:
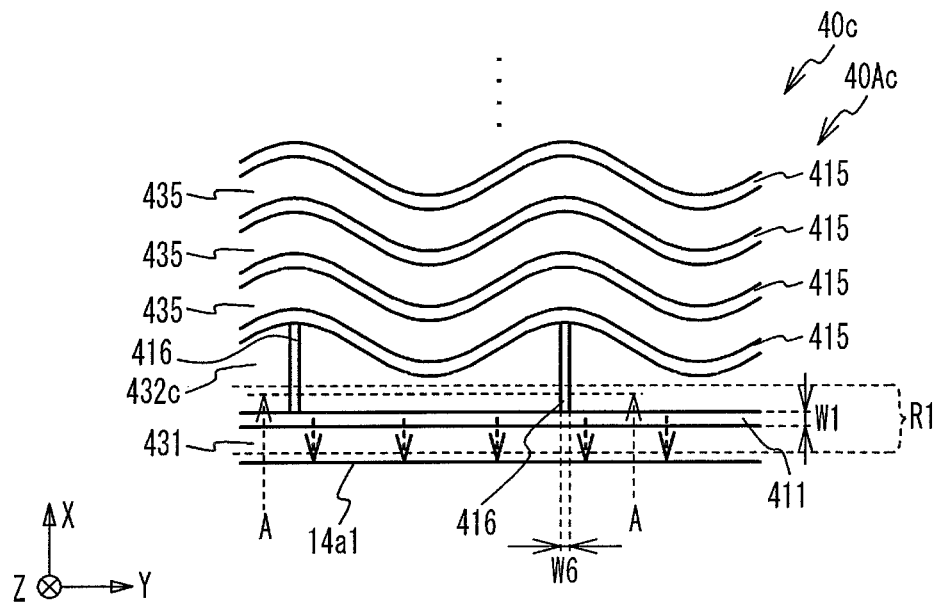
FIG. 6A is an enlarged view illustrating a part of a flow path portion of a separator in a third variation.

FIG. 6A is an enlarged view illustrating a part of a flow path portion 40Ac of a separator 40c in a third variation. FIG. 6A corresponds to FIG. 3B. Communicating grooves 416 extending in the X direction communicate the groove 411 with the groove 415 adjacent to the groove 411. The communication grooves 416 are formed across a rib 432c located between the grooves 411 and 415. The communication groove 416 is provided in a part where the interval, in the X direction, between the grooves 411 and 415 adjacent to each other increases. When the anode gas flows in the grooves 411 and 415 adjacent to each other, the anode gas also flows into the communication grooves 416. It is thus possible to supply the anode gas to the above-mentioned part, and to suppress the deterioration of the power generation performance.

Figure 6B:
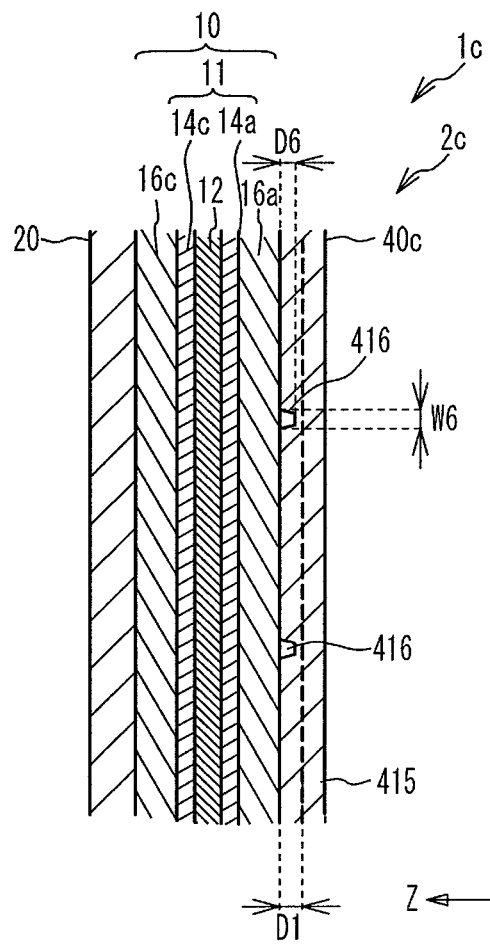
FIG. 6B is a cross-sectional view, corresponding to line A-A of FIG. 6A, of a unit cell of a fuel cell in the third variation.

FIG. 6B is a cross-sectional view, corresponding to line A-A of FIG. 6A, of a unit cell 2c of a fuel cell 1c in a third variation. As illustrated in FIG. 6B, a depth D6 of the communication groove 416 is smaller than a depth D1 of the groove 411, specifically, than each depth of the flow path grooves 41. It is therefore possible to suppress a decrease in thickness of a part of the separator 40c caused by an increase in an elongation amount of its base metal due to the formation of the communication groove 416 in press working. A width W6 of the communicating groove 416 is smaller than the width W1 of the groove 411, specifically, than each width of the flow path grooves 41. This suppresses the decrease in the clamping force exerting on the MEA 11 caused by the communication grooves 416, which suppresses the decrease in strength of the MEA 11. In the third variation, since the groove 411 extends in the Y direction within the region R1, it is possible to supply the anode gas to the edge 14a1 of the catalyst layer 14a, and to suppress the deterioration of the power generation performance.

Figure 7A:
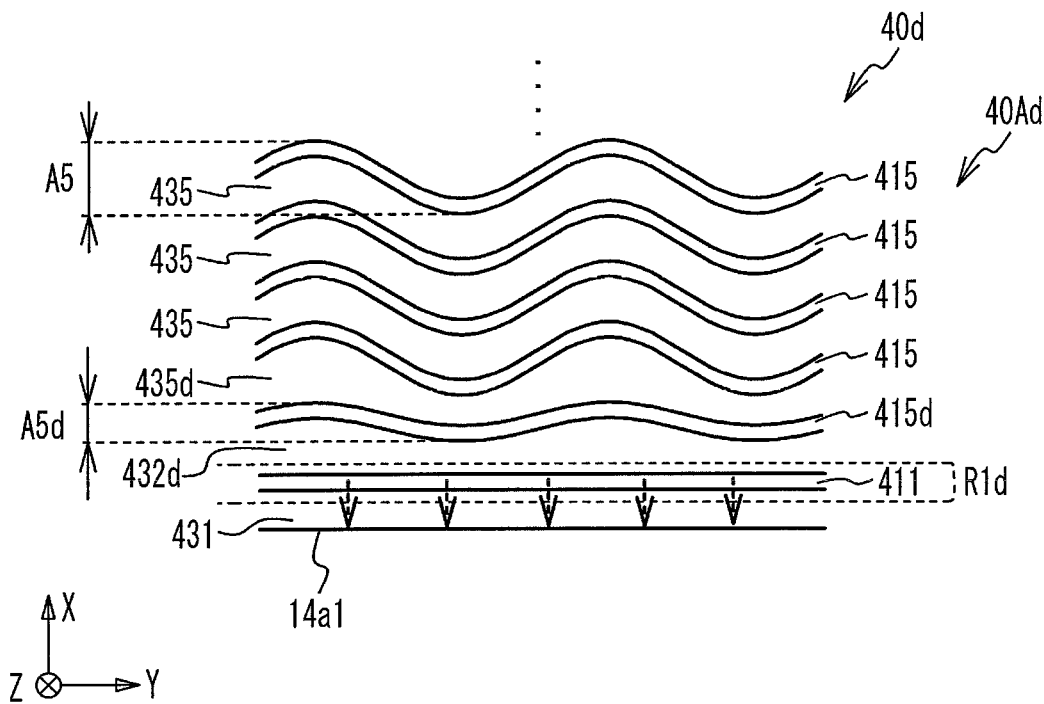
FIG. 7A is an enlarged view illustrating a part of a flow path portion of a separator in a fourth variation.

FIG. 7A is an enlarged view illustrating a part of a flow path portion 40Ad of a separator 40d in the fourth variation. FIG. 7A corresponds to FIG. 3B. A groove 415d adjacent to the groove 411 has a wavy shape like the other grooves 415, and has substantially the same wavelength and the same phase. However, amplitude A5d of the groove 415d is smaller than the amplitude A5 of the groove 415. This suppresses the increase in the width of a rib 432d located between the grooves 411 and 415d in the X direction. It is thus possible to suppress the anode gas from being not partially supplied to the catalyst layer 14a, and to suppress the deterioration of the power generation performance. A side surface of a rib 435d adjacent to the groove 415d also has a wavy shape with amplitude that is smaller than amplitude of the other side surface of the rib 435d adjacent to the groove 415.

Instead of the groove 415 adjacent to the groove 412 illustrated in FIG. 3A, the groove 415d may be provided. In this case, the amplitude of the groove 415d adjacent to the groove 411 illustrated in FIG. 7A is smaller than each amplitude of the grooves other than that of the groove 415d adjacent to the groove 412.

In the fourth variation, when the shape of the groove 411 is interpreted as a wavy shape with amplitude of zero, the groove 411, the groove 415d, and the groove 415 adjacent to the groove 415d gradually differ in amplitude in this order. This suppresses the increase in the elongation percentage of the base material in the region from the groove 411 to the groove 415 adjacent to the groove 415d, thereby suppressing the decrease in the yield rate. It is thus possible to reduce the residual stress exerting on the this region in the press working, and to reduce the possibility that the warp occurs in the separator 40d.

FIG. 7A illustrates a region R1d having a width, in the X direction, which is smaller than the amplitude A5d of the groove 415d smaller than the amplitude A5 of the grooves 415. The region R1d extends in the Y direction. The groove 411 extends in the Y direction within the region R1d. Also in the fourth variation, it is possible to supply the anode gas to the edge 14a1 of the catalyst layer 14a, and to suppress the deterioration of the power generation performance.

Figure 7B:
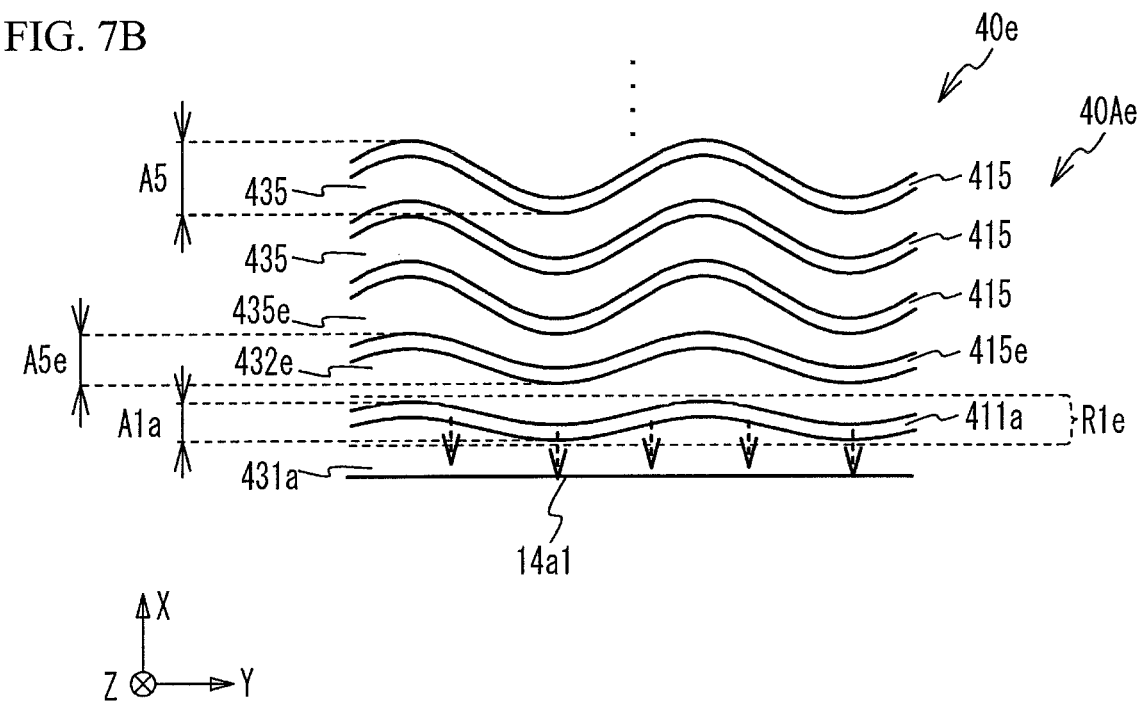
FIG. 7B is an enlarged view illustrating a part of a flow path portion of a separator in a fifth variation.

FIG. 7B is an enlarged view illustrating a part of a flow path portion 40Ae of a separator 40e in a fifth variation. In the fifth variation, like the first variation, the end groove 411a closest to the edge 14a1 has a wavy shape with the amplitude smaller than that of the other grooves 415 each having a wavy shape. A groove 415e adjacent to the groove 411a has a wavy shape and has substantially the same wavelength and the same phase as the other grooves 415. However, amplitude A5e of the groove 415e is smaller than the amplitude A5 of the groove 415, and is greater than the amplitude A1a of the groove 411a. This suppresses the increase in the width of a rib 432e located between the grooves 411a and 415e in the X direction. It is thus possible to suppress the anode gas from not being supplied to the catalyst layer 14a, and to suppress the deterioration of the power generation performance. A side surface of the rib 432e adjacent to the groove 411a also has a wavy shape with amplitude smaller than that of the other side surface of the rib 432e adjacent to the groove 415e. A side surface of a rib 435e adjacent to the groove 415e also has a wavy shape with amplitude smaller than that of the other side surface of the rib 435e adjacent to the groove 415.

Also in the fifth variation, the groove 411a, the groove 415e, and the groove 415 adjacent to the groove 415e gradually differ in the amplitude in this order. This suppresses the increase in the elongation percentage of the base material in the region from the groove 411a to the groove 415 adjacent to the groove 415e, thereby suppressing the decrease in the yield rate. It is thus possible to reduce the residual stress exerting on the this region in the press working, and to reduce the possibility that the warp occurs in the separator 40e.

FIG. 7B illustrates a region R1e having a width, in the X direction, which is smaller than the amplitude A5e of the groove 415e smaller than the amplitude A5 of the grooves 415. The region R1e extends in the Y direction. The groove 411a extends in the Y direction within the region R1e. Also in the fifth variation, it is possible to supply the anode gas to the edge 14a1 of the catalyst layer 14a, and to suppress the deterioration of the power generation performance.

Preferably, the end groove closest to the edge 14a1 is formed to overlap the catalyst layer 14a in the Z direction, as described in the above-described embodiment and variations, but it is not limited thereto. For example, the edge 14a1 may be located within the end groove, or the end groove may be located outside the catalyst layer 14a. In this case, the edge 14a1 is preferably closer to the end groove than to any other grooves such that the anode gas flowing through the end groove is supplied to the catalyst layer 14a to contribute to the power generation.

In the above-described variations, the end groove on the side of the edge 14a1 is described as an example, but an end groove on the side of the edge 14a2 may be configured similarly. Further, the shape of an end groove on the side of the edge 14a1 may be any one of the shapes in the above-described embodiment and variations, and the shape of an end groove on the side of the edge 14a2 may be any one of the shapes in the above-described embodiment and the variations.

The flow path portion in the present embodiment and variations described above may be applied to the cathode separator.

Although the separators 40 to 40e are adopted in the water-cooled fuel cell 1 using liquid as the coolant, they are not limited thereto, and may be adopted in an air-cooled fuel cell using air as the coolant.

The wavy-shaped groove described above may have a sine wavy shape, or a wavy shape with a straight line and an arc.

In the above-described embodiment and modifications, the grooves have substantially the same wavelength and the same phase. but they are not limited thereto. Also, in this case, as long as the end groove on the side of the edge 14a1 has a linear shape or a wavy shape with a relatively small amplitude so as to extend in the Y direction within the region R1, it is possible to suppress the increase in the interval from the end groove to the edge 14a1. Further, in the above-described embodiment and the variations, the grooves are formed at approximately the same pitch interval, but not limited thereto.

Although some embodiments of the present disclosure have been described in detail, the present disclosure is not limited to the specific embodiments but may be varied or changed within the scope of the present disclosure as claimed.

What is claimed is:
1. A fuel cell comprising:
    an electrolyte membrane;
    first and second catalyst layers respectively formed on first and second surfaces of the electrolyte membrane; and
    a separator disposed opposite to the electrolyte membrane with respect to the first catalyst layer, wherein
    the separator includes flow path grooves through which reaction gas flows between the separator and the first catalyst layer,
    the flow path grooves include:
        wavy grooves wavily extending in a first direction and arranged in a second direction orthogonal to the first direction; and
        first and second end grooves between which the wavy grooves are located in the second direction,
    the first catalyst layer includes first and second edges facing each other in the second direction, the first and second end grooves are respectively adjacent to the first and second edges of the first catalyst layer in the second direction, the first and second end grooves respectively extend in the first direction within first and second regions, the first and second regions extend in the first direction, each width of the first and second regions in the second direction is smaller than each amplitude of the wavy grooves, and each width of the first and second end grooves in the second direction is constant along the first direction and is smaller than each amplitude of the wavy grooves.

2. The fuel cell of claim 1, wherein at least one of the first and second end grooves linearly extends in the first direction.

3. The fuel cell of claim 1, wherein at least one of the first and second end grooves wavily extends in the first direction.

4. The fuel cell of claim 1, wherein at least one of the first and second end grooves includes a linear portion and a curved portion.

5. The fuel cell of claim 1, further comprising
a communication groove communicating the first end groove with the wavy groove closest to the first end groove among the wavy grooves,
wherein a depth of the communication groove is smaller than each depth of the flow path grooves.

6. The fuel cell of claim 5, wherein a width of the communication groove is smaller than each width of the flow path grooves.

7. The fuel cell of claim 1, wherein wavelengths of the wavy grooves are identical to each other.

8. The fuel cell of claim 7, wherein phases of the wavy grooves are identical to each other.

9. The fuel cell of claim 1, wherein the amplitudes of the wavy grooves are identical to each other.

10. The fuel cell of claim 1, wherein the amplitude of the wavy groove closest to the first end groove among the wavy grooves is smaller than each amplitude of the wavy grooves other than the wavy groove closest to the second end groove among the wavy grooves.

* * * * *